Figure 1:
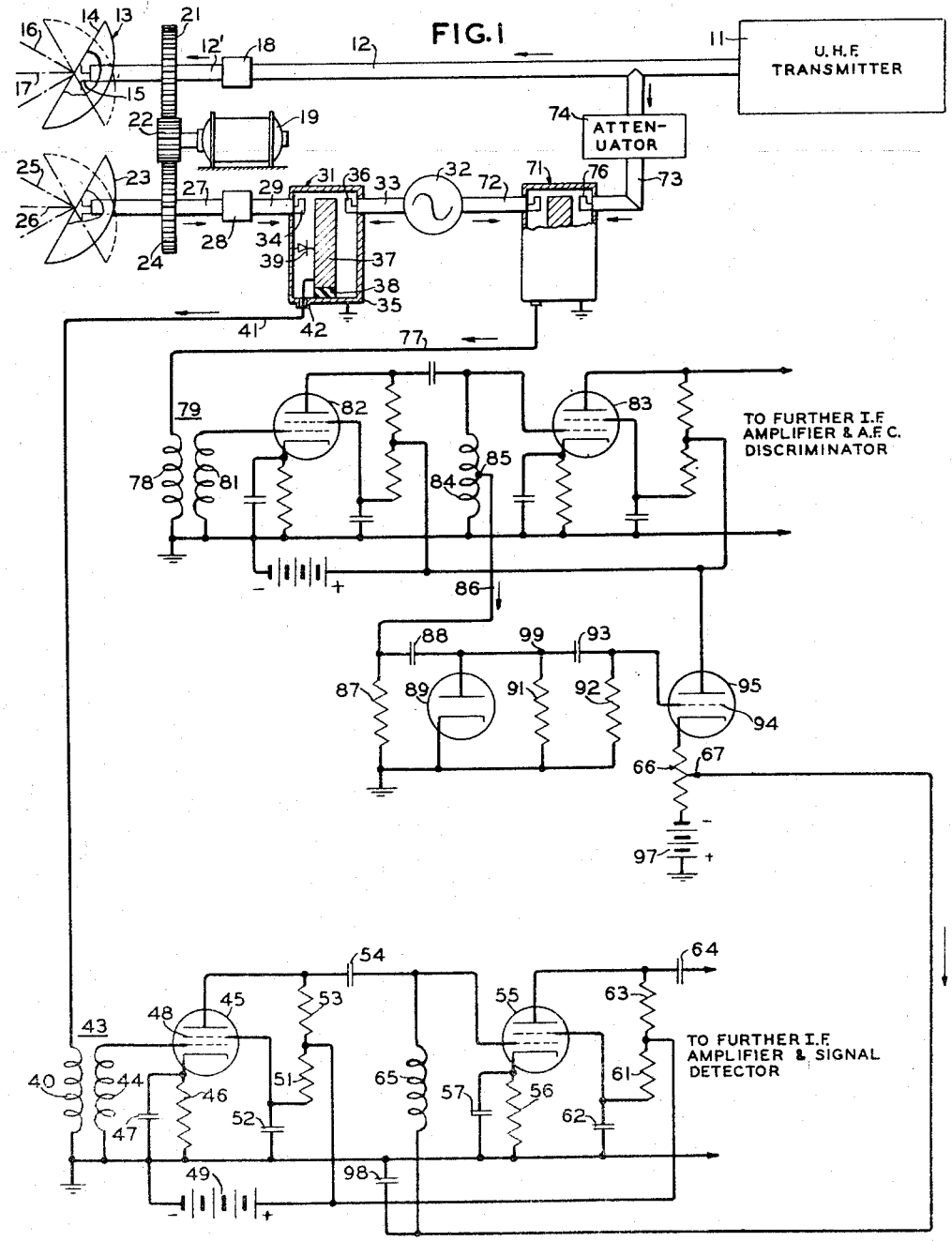

INVENTORS:
ERNEST FRANK
DANIEL S. PENSYL, DECEASED,
BY MARY P. PENSYL, EXECUTRIX
BY
ATTORNEY

Patented Jan. 2, 1951

2,536,051

UNITED STATES PATENT OFFICE 2,536,051

RECEIVER GAIN CONTROL FOR AUTOMATICALLY COMPENSATING FOR VARIATIONS IN TRANSMITTER OUTPUT ENERGY

Ernest Frank, Hempstead, N. Y., and Daniel S. Pensyl, deceased, late of Garden City, N. Y., by Mary P. Pensyl, executrix, Garden City, N. Y., assignors to The Sperry Corporation, a corporation of Delaware Application September 8, 1944, Serial No. 553,202

6 Claims. (Cl. 343—11)

The present invention relates to radio direction detecting devices and, more particularly, to devices for transmitting ultra high frequency energy toward a distant object and receiving ultra high frequency energy reflected therefrom to obtain information regarding the position of the distant object.

Devices of the above type have been employed in various arrangements for directionally scanning and searching over a wide range of directions, and for locating unseen objects, in direction as well as range, with respect to the position at which the radio apparatus is located.

A further well known use for radio direction-detecting devices of the above type is for "tracking" the movements of a remote invisible object. Tracking systems, adapted to be maintained aligned toward an object, are commonly employed for purposes such as anti-aircraft gun laying and for directing powerful searchlights toward a moving object or target.

When radio object detection systems are used in the above manner for tracking an object, a highly directive antenna usually is employed for transmitting ultra high frequency energy. The direction of transmission of this antenna is periodically varied through a small range, for example through a conical path, in order that periodic variations may be produced in the amount of energy communicated to the object. One very successful arrangement for producing periodic variations of directivity of the transmitting antenna embodies a highly directive antenna arranged for rotation about a "principal" axis slightly divergent from the axis of maximum directivity of the antenna. Motive means is coupled to this rotatable antenna system for rotating the directive antenna about the principal axis described above, whereby periodic movements of the transmitting antenna are accompanied by the movement of the axis of maximum directivity of the antenna through a conical locus.

With the axis of rotation or principal axis of the directive transmitting antenna described above aimed directly toward an energy-reflecting object, there is no periodic or cyclic variation of the energy transmitted to said object due to the periodically varied direction of transmission of said antenna. However, if the object moves away from the antenna rotation axis, then the intensity of the energy transmitted to the object varies from a maximum value corresponding to the position of the transmitting antenna with its axis of maximum directivity aimed most nearly toward the object, to a minimum when the transmitting antenna has rotated through 180° from this position. Thus, during a divergence of the object from the principal axis of the antenna system described above, a periodic variation synchronous with the rotation of the antenna is produced in the amount of energy transmitted to the object.

A radio receiver is adjusted for receiving energy transmitted to and reflected from said object. If desired, the receiver also may have such directional receiving characteristics as to be particularly sensitive to energy arriving from the general direction of the object. This may be accomplished, for example, through a moderately directive receiving antenna aimed generally along the principal axis of the transmitting antenna or through a very highly directive receiving antenna whose direction of maximum receptivity is varied in synchronism with the directional variation of said transmitting antenna. If desired, arrangements may be provided for delivering energy to said receiver from the same highly directive antenna which is employed for the aforementioned transmitter.

If the axis of rotation or principal axis of said transmitting antenna is aimed directly toward said energy-reflecting object, the energy detected in the receiver should not vary during the rotation of the antenna. On the other hand, if the axis of rotation of the antenna diverges slightly from the direction of said object, the detected output of the receiver should vary synchronously with the variation of directivity of said transmitting antenna, and the phasal relationship between the detected output variation and the motion of the antenna is then indicative of the direction of divergence or "error," so that an operator observing a relative phase indicator coupled to said receiver is enabled to correct quickly and accurately the direction of the transmitting antenna axis of rotation.

In the operation of radio direction detecting systems employed for tracking distant objects, it has been found that the output energy level of the ultra high frequency transmitter may vary periodically in synchronism with the rotation of the antenna, due apparently to an appreciably varying reaction of the antenna on the transmitter. Since considerable effort is usually directed toward a design of a transmitting antenna for minimum change of reaction, such variation is usually attributed to mechanical imperfections of the transmitting antenna and transmission system. Such a cyclic variation of transmitter output energy is particularly objectionable, since this variation may result in a corresponding cyclic variation of the energy transmitted to a distant object even though the direction of the distant object accurately coincides with the axis of rotation of the directive antenna.

Under these circumstances, a false error indication is produced by the radio object detection receiver, and if the transmitting antenna rotation axis is shifted to overcome this false error, then the tracking system becomes incorrectly aimed. Such a false error therefore may result in serious variations of the data obtained for gun laying and searchlight control, impairing the effectiveness of the radio tracking system.

As explained above, due to appreciable reaction of a radio object detection transmitting antenna upon the transmitter coupled thereto, an appreciable periodic variation of transmitter output energy intensity may accompany the periodic variation of the direction of maximum intensity of the transmitting antenna. According to the present invention, a detector is coupled to the radio object detection transmitter for producing an output signal of magnitude varying in accordance with variation of the intensity of the output of said transmitter. A receiver gain control is coupled to one or more amplifier stages within the radio object detection receiver, and is coupled to said detector for controlling the gain of said receiver amplifier or amplifiers in accordance with the output level of said detector. The operating level, sensitivity, and manner of operation of said gain control device is so adjusted as to maintain the amplification within said radio object detection receiver substantially inversely proportional to the output intensity of the radio object detection transmitter.

With this arrangement, no variation of the receiver output is produced in response to variations of the output intensity from the ultra high frequency radio object detection transmitter, and thus any variations of receiver output synchronous with the periodic variation of directivity of the variable object detection antenna are due solely to divergence between the direction of a detected object and the principal axis of said variable antenna. The "false error" described above is therefore entirely eliminated.

Accordingly, it is an object of the present invention to provide a method for compensating in a radio object detection system for output variations of the radio object detection transmitter.

It is a further object of the present invention to provide apparatus for maintaining substantially constant the product of transmitter output intensity and receiver amplification in a radio object detecting system.

It is another object of the present invention to provide, in a radio object detection and tracking system, means for varying the receiver sensitivity to compensate for periodic transmitter output intensity variations, whereby variations of the receiver's detected signal intensity are rendered accurately indicative of the divergence between the direction of a detected object and the principal axis of the transmitting antenna.

Figure 2:
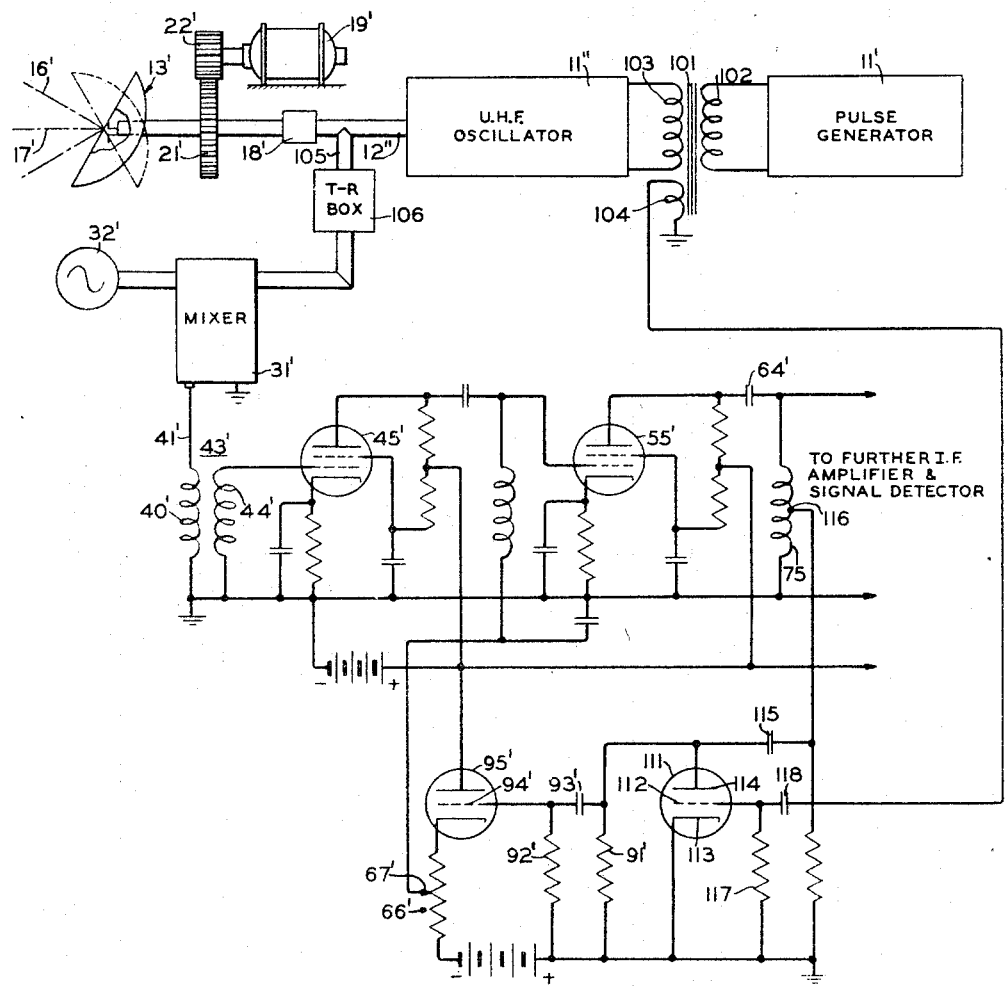

Other objects will become apparent from the following description, taken in conjunction with the accompanying drawings, wherein Fig. 1 is a circuit diagram of an embodiment of the present invention applied to a radio object detection system employing separate, synchronously movable transmitting and receiving antennas, and also including a superheterodyne mixer and intermediate-frequency amplifier coupled to the transmitter of said object detection system for generating an automatic frequency control signal; and Fig. 2 is a circuit diagram of an embodiment of the present invention adapted for connection to a pulsed radio object detection system employing a common antenna for transmission and reception and also employing a single superheterodyne mixer and intermediate-frequency amplifier channel for signal detection and for automatic frequency control.

Referring now to Fig. 1, an ultra high frequency transmitter 11 is shown coupled through a transmission line 12, such as a coaxial line or a hollow pipe wave guide, to a highly directive transmitting antenna 13. As shown in Fig. 1 the highly directive antenna 13 may comprise a parabolic reflector 14 and an exciting element 15 positioned at the focal point thereof. Preferably, the reflector 14 may be formed in the shape of a paraboloid, and may be connected to an extension 12' of transmission line 12 in such a manner that the axis of maximum directivity 16 of antenna 13 diverges slightly from the axis 17 of the transmission line extension 12'.

A rotatable coupling joint 18 may be provided to permit relative rotation between sections 12 and 12' of the transmission line connecting the ultra high frequency transmitter 11 to the directive antenna 13. Transmission line section 12' and antenna 13 are coupled to a driving motor 19 through gear elements 21 and 22, for rotation of antenna 13 about the principal axis 17 at a predetermined speed ratio with respect to the rotation speed of motor 19.

A second highly directive antenna 23 may be provided, also coupled to motor 19 through a gear element 24 for rotation synchronously with the highly directive antenna 13. Receiving antenna 23 is arranged with its axis of maximum directivity 25 maintained parallel to the transmitting antenna axis of maximum directivity 16 during rotation of antenna 23 about its principal axis 26.

A further ultra high frequency transmission line section 27 is coupled through a rotatable joint 28 and a non-rotating transmission line section 29 to a receiving signal mixer 31, for delivering thereto energy arriving from a distant object and intercepted by receiving antenna 23. An ultra high frequency signal source 32 is shown coupled also to the mixer 31 through a transmission line section 33, for delivering to said mixer energy at a frequency different from the transmitter frequency by a value equal to a desired intermediate frequency.

Mixed 31 is shown in cross-section to illustrate the manner in which the transmission line sections 29 and 33 are coupled thereto, and also to illustrate the manner in which a miniature crystal detector is connected therein. A hollow cylindrical body 35 formed of conductive material is provided with two openings through the cylindrical wall thereof for insertion of coaxial line sections 29 and 33. As shown, a first coupling loop 34 is formed from an extension of the inner conductor of the transmission line section 29 and is connected to the outer conductor of transmission line section 29 at a point adjacent with the cylindrical inner surface of the mixer chamber 35. A further electromagnetic coupling loop 36 is provided on the end of line section 33, for similarly coupling source 32 to the electromagnetic field within the resonator chamber 35.

A cylindrical rod 37 is positioned coaxially within the wall 35 and is supported and insulated from the bottom of the chamber by a dielectric disc 38. If desired, the rod section 37 may be cemented to dielectric disc 38 which may be cemented in turn to the bottom disc portion of the chamber 35. With respect to the high frequency electromagnetic field within the resonator 35, the cylindrical rod 37 serves as a reentrant portion of a cavity resonator formed by the combination of the rod and the outer shell 35.

A crystal detector 39, such as a silicon detector, for example, is connected between points of ultra high frequency potential difference on the cylindrical wall of the chamber 35 and the reentrant portion 37 of the resonator. This crystal detector rectifies current components of the received signal frequency and of the frequency of source 32, to provide an output current component having a frequency equal to the difference of said frequencies. An intermediate frequency output conductor 41 is connected to the cylindrical rod 37 and is passed through an insulating bushing 42 through the bottom of the chamber 35. The conductive chamber 35 is connected to ground, so that the conductor 41 provides a source of intermediate frequency potential with respect to ground.

From the mixer 31, conductor 41 extends to the primary winding 40 of an intermediate frequency input transformer 43 having a secondary winding 44 coupled to said primary winding 40. The secondary winding 44 of transformer 43 is connected at one end to ground, and at the opposite end to the control grid of a tetrode or pentode tube 45, a tetrode being illustrated in the drawing. The cathode of this intermediate frequency amplifier tube is biased by a resistor 46 which is by-passed to ground by a condenser 47 in a well known manner. The screen grid 48 of the intermediate frequency amplifier tube 45 is supplied with high positive potential with respect to ground by source 49 through a voltage-dropping resistor 51 and is by-passed to ground through condenser 52. The anode terminal of intermediate frequency amplifier tube 45 is supplied with high positive potential from source 49 through a resistor 53 across which an amplified intermediate frequency alternating voltage is developed when an intermediate frequency input signal is supplied to primary winding 40 from the crystal mixer 31.

The amplified intermediate frequency voltage developed across the anode supply resistor 53 is applied through coupling condenser 54 to the grid of a further intermediate frequency amplifier tube 55 which is similar to the first intermediate frequency amplifier tube 45. Further bias resistor 56 and by-pass condenser 57, screen by-pass condenser 62, screen grid voltage-drop resistor 61, and a further plate current supply resistor 63 are provided for the second intermediate frequency amplifier tube 55, similar to the elements connected to the first intermediate frequency amplifier 45. An inductor 65 is connected at one end to the control grid of intermediate frequency amplifier tube 55 and at the opposite end is connected to a voltage control potentiometer 66 through a movable element 67, for variation of the direct current potential of the control grid in a manner to be described below. Preferably, inductor 65 is arranged to cooperate with the shunt capacitance afforded by the output circuit of tube 45 and the input circuit of tube 55, to resonate at the intermediate frequency.

A further coupling condenser 64 is connected at one end to the anode of the second intermediate frequency amplifier tube 55, and is provided for connection to the control grid of a further intermediate frequency amplifier stage. Any desired number of intermediate frequency amplifier stages may be provided following the second tube 55, in order to provide such amplification or gain as required for normal output of the radio object detection receiver with the most distant objects to be detected.

Usually, it is desirable to provide means in the radio object detection system for varying the frequency of the ultra high frequency source 32 in accordance with frequency variations of the ultra high frequency transmitter 11. For this purpose, a superheterodyne receiving system may be arranged for simultaneously receiving signals from the source 32 and the transmitter 11, and producing and amplifying an intermediate frequency signal. A frequency discriminator (not shown) is adapted to receive the amplified intermediate frequency signal and to generate a frequency-control signal potential for controlling the frequency of source 32. Such automatic frequency control systems are well known, and accordingly, only such portions of the automatic frequency control mixer and I. F. amplifier as cooperate directly with the present invention will be described in detail.

For generating an I. F. signal for automatic frequency control, a second mixer unit 71, similar in all respects to the mixer unit 31, is coupled to the high frequency source 32 through a transmission line section 72. The A. F. C. mixer 71 is also coupled to the ultra high frequency transmitter 11 through a transmission line section 73 and an attenuator 74. Attenuator 74 may take any of several well known forms, one of the simplest forms being an appreciable length of relatively high loss transmission line for insertion between the transmission line section 73 and the ultra high frequency transmitter 11. Thus, a relatively weak signal of intensity proportional to the transmitter output intensity may be applied to the electro-magnetic coupling loop 76 for cooperation with the energy fed from the ultra high frequency source 32 to produce an intermediate-frequency signal which is applied to the intermediate-frequency output conductor 77. As shown, the conductor 77 extends from mixer 71 to the primary winding 78 of an intermediate frequency input transformer 79 which is generally similar to the object detection receiver intermediate frequency input transformer 43.

The secondary winding 81 of transformer 79 is connected between ground and the control grid of the first automatic frequency control intermediate-frequency amplifier 82. Cathode bias and by-pass elements, screen grid bias and by-pass elements, and plate supply resistor and output coupling condenser are shown connected to the intermediate-frequency amplifier stage 82 exactly in the same manner as described in connection with the signal receiver stages 45 and 55. A further intermediate frequency amplifier stage 83 is supplied with an amplified intermediate frequency signal from the first stage 82, and the second stage 83 may be coupled to further cascade amplifier stages leading to the automatic frequency control discriminator.

A substantially resonant output load impedance is provided for the first intermediate-frequency amplifier tube 82 by an inductor 84 connected between the control grid of the second intermediate-frequency amplifier tube 83 and ground, and shunted by the anode-to-ground capacitance of the first tube 82 and the input capacitance of tube 83. A portion of the amplified intermediate-frequency voltage developed across inductor 84 is produced at an intermediate tap 85 thereof, and is applied through conductor 86 to a resistor 87 which is connected, together with capacitor 88, for applying intermediate-frequency potential to a diode rectifier 89. Thus, diode rectifier 89 is arranged as a rectifier for the amplified intermediate-frequency energy supplied by mixer 71.

A resistance-capacitance network comprising resistors 91 and 92 and coupling condenser 93 is connected to the cathode-anode circuit of diode rectifier 89, for applying to the grid 94 of a triode amplifier tube 95 a signal potential varying in accordance with the output energy intensity of ultra high frequency transmitter 11. The anode of triode 95 is connected to a positive potential source with respect to ground, while the cathode of triode 95 is connected through potentiometer resistor 66 to a source 97 of negative potential with respect to ground.

During the absence of an intermediate frequency signal from the input transformer 79 of the intermediate-frequency amplifier stage 82, no amplified intermediate-frequency signal voltage is applied through conductor 86 to the diode rectifier 89, and thus, the grid 94 of triode stage 95 remains at substantially ground potential. Under these conditions, the movable slider portion 67 of potentiometer 66 may be positioned as desired for applying substantially ground potential to the junction of the by-pass condenser 98 and the lower terminal of the intermediate-frequency load inductor 65.

During a period of appreciable output from the ultra high frequency transmitter 11, on the other hand, an appreciable intermediate-frequency voltage is developed on conductor 77 and applied to the intermediate-frequency amplifier stage 82 and amplified therein to a relatively great intermediate-frequency voltage across inductor 84. An appreciable intermediate-frequency voltage is then applied to the diode rectifier 89, resulting in an appreciable negative bias of the junction point 99 with respect to ground. Accordingly, a voltage variation toward increased negative bias is applied to the control grid of the triode 95, resulting in a momentary decrease of current through the tube 95 and the potentiometer resistor 66, and accordingly resulting in a relatively high negative potential of the slider arm 67 and accordingly of inductor 65 with respect to ground. This results in a material reduction in the gain or amplification of the second intermediate-frequency amplifier 55. By careful adjustment of the point 85 on the inductor 84 and by careful adjustment of the position of slider arm 67 on the potentiometer resistor 66, the operating characteristics of the rectifier 89 and gain control amplifier 95 may be adjusted so that the gain or amplification of the intermediate-frequency amplifier stage 55 varies substantially in inverse proportion to the output intensity of ultra high frequency transmitter 11. Under these conditions, if the output intensity of ultra high frequency transmitter 11 should vary over a 2 to 1 range cyclically with rotation of antenna 13 about the principal axis 17, the amplification or gain of the second intermediate frequency amplifier stage of the signal receiver would simultaneously vary over a 1 to 2 range, in inverse relation with the intensity variation of transmitter 11.

The over-all effect on the operation of the object detection and tracking system, of the inverse changes of receiver gain during the cyclic changes of the transmitter output intensity, is the same as would be the effect of holding the receiver gain constant and providing such special apparatus as required to hold the output intensity of the ultra high frequency transmitter 11 constant. Actually, however, it is extremely difficult, if not practically impossible, to prevent variation of output of transmitter 11. On the other hand, the regulation of the receiver amplification or gain to compensate for transmitter output variations easily may be accomplished by the relatively simple apparatus described above, in accordance with the teachings of the present invention.

The apparatus described in the foregoing discussion of Fig. 1 is suitable for use in either an ultra high frequency "pulse" detection system or a "continuous wave" ultra high frequency radio object detection system. Either of the two well known systems is suitable for directional tracking, and with either of these systems, a detected receiver signal output is produced having a frequency component corresponding to the rate of rotation of the transmitting antenna, the phase of which is indicative of direction of "error."

In some pulse systems used for distance measurement as well as for radio object detection and tracking, a single directive antenna is employed for both transmission and reception. The transmitter may be operated during very brief intervals, for example, during intervals approximately 2 microseconds long, and may be rendered inoperative during alternate intervals of appreciable length, for example, during intervals of 500 microseconds.

In the system shown in Fig. 2, the transmitter comprises a pulse generator 11' and an ultra high frequency oscillator 11", coupled together by a transformer 101. In this arrangement, the pulse generator 11' initiates a pulse wave which is transmitted through transformer 101 to the ultra high frequency oscillator 11", to trigger this oscillator for producing the relatively short pulse or train of ultra high frequency oscillations. Such pulses are repeated at regular intervals which may be of the order of 500 microseconds, as mentioned above.

A single directive antenna 13', generally similar to the directive antenna 13 described in connection with Fig. 1, is arranged to be supplied with energy from the ultra high frequency pulse transmitter 11', 11" through a transmission line 12", and a rotatable joint 18'. A motor 19' is geared to the antenna 13' for causing the axis of maximum directivity 16' of antenna 13' to be swept through a conical locus about the principal axis 17'.

The antenna 13' and the transmitter 11', 11" are arranged to be coupled through a further transmission line 105 and a transmitting-receiving switch box 106 to a mixer 31', to which further energy is supplied from an ultra high frequency source oscillator 32'. During the intervening periods between pulses of ultra high frequency energy produced by transmitter 11', 11", the transmitting-receiving switching box 106 serves as a coupling device for efficient transfer of received or intercepted energy from antenna 13' to the mixer 31'. During these intervals, any pulse of received energy resulting from a pulse of ultra high frequency energy transmitted through antenna 13' to a distant object and reflected therefrom and then intercepted by antenna 13', is supplied through the transmitting-receiving switch box 106 to the mixer 31'. An intermediate-frequency output signal is then produced on conductor 41' and supplied to the primary 40' of intermediate-frequency input transformer 43'. The secondary 44' of the intermediate-frequency transformer then applies an intermediate-frequency signal voltage to the control grid circuit of the first intermediate-frequency amplifier 45' in much the same manner as described for the corresponding intermediate-frequency amplifier stage of Fig. 1.

The intermediate-frequency amplifier 45' operates in a well known manner to apply to the control grid circuit of the succeeding amplifier stage 55' an amplified version of the intermediate-frequency signal delivered by the mixer 31'. The amplifier stage 55' provides further amplification of the signal produced in the output circuit of the first stage 45', and delivers a greatly amplified signal to an output circuit including coupling capacitor 64' and a second stage output inductor 75.

A vacuum tube 111 including a control grid 112 and a grounded cathode 113 has an anode 114 coupled through condenser 115 to an adjustable tap 116 on output inductor 75 of the second amplifier stage 55'. The control grid 112 of vacuum tube 111 is coupled by means of a resistor 117 and a coupling condenser 118 to an auxiliary secondary winding 104 included on the coupling transformer 101, which includes a primary winding 102 connected to pulse generator 11' and a principal secondary winding 103 connected to ultra high frequency oscillator 11".

The polarity of auxiliary winding 104 connected, through a grounded circuit, to the grid-cathode circuit of the tube 111 is so fixed as to apply to the grid 112 a positive pulse during the relatively brief periods of transmission from ultra high frequency transmitter 11', 11".

Due to grid rectification of the tube 111, in a well known manner, the grid of this tube normally remains at a high negative potential with respect to the cathode 113, of the order of 100 volts, and the potential of the grid 112 is momentarily raised to a value slightly positive with respect to cathode 113 during the aforementioned transmitted pulses. During these transmitted pulses, therefore, the tube 111 is rendered receptive to current flow between cathode and anode, and is thereby enabled to operate effectively as a diode detector comprising anode 114 and cathode 113, switched or "gated" by the pulses originated in pulse generator 11' and supplied to ultra high frequency oscillator 11". An amplified intermediate-frequency output voltage produced at tap 116 on the second intermediate-frequency stage output inductor 75 is then applied through coupling condenser 115 to the anode 114 of tube 111, and, during the relatively brief intermittent periods of pulse transmitter output, the intermediate-frequency energy pulse produced in mixer 31' and amplified through intermediate-frequency amplifiers 45' and 55' produces an appreciable negative output potential at the anode 114 of tube 111.

Through a resistance-capacitance coupling network 91', 92' and 93', the output potential variations produced at the anode 114 of the switched detector 111 are then applied to the grid 94' of a triode amplifier 95'. This amplifier tube is connected in a manner similar to the amplifier 95 of Fig. 1, to vary the voltage drop across potentiometer 66' and hence the potential relative to ground of potentiometer arm 67'. Accordingly, these potential variations serve to vary the grid bias and thereby vary the voltage amplification of the second amplifier stage 55' of the pulse radio object detection receiver.

During periods of transmission from ultra high frequency transmitter 11', 11", the transmitting-receiving switching box acts as a very inefficient transmission device due to an electrical discharge produced therein by the high potential of the transmitter output pulse; however, sufficient ultra high frequency energy is conducted through T-R box 106 to activate mixer 31'. Accordingly, T-R box 106 acts to attenuate greatly the energy conducted from the transmitter 11', 11" to the mixer 31' during each transmitted pulse. This is important as a safeguard for mixer 31', to insure that the crystal detector element therein is operated within its normal operating energy level.

During the transmitted pulses, therefore, the amplifier stages 45' and 55' are provided with an intermediate-frequency signal independent of any energy received by antenna 13' from distant objects, and therefore the intermediate-frequency signal detected by the momentarily operative detector 111 during the transmitted pulse is made to vary according to the variations of energy level of the transmitter 11', 11". If the output energy level of this transmitter increases, the anode 114 of detector 111 is made more highly negative with respect to the cathode 113 and ground, and accordingly, the amplification of the intermediate-frequency amplifier stage 55' is appreciably reduced.

Conversely, if the output intensity of the transmitter 11', 11" is materially reduced, then a weaker intermediate-frequency signal is detected by the detector 111, which is made operative only during pulses of energy transmitted from the oscillator 11", and accordingly the amplification of the second intermediate-frequency amplifier stage 55' is permitted to increase to compensate for the decreased output intensity of the ultra high frequency oscillator 11".

The present invention has been described as applied in generally similar manners to two different object detection systems. In the first of these, illustrated in Fig. 1, and suitable for operation either as a pulse system or as a continuous-wave transmitting system, a mixer and automatic frequency control intermediate-frequency amplifier were utilized for coupling an ultra high frequency transmitter 11 to a detector 89 which served to produce an output signal or potential varying substantially according to the output intensity variations of the transmitter 11.

This varying signal or potential developed by detector 89 was then applied to a control tube 95 connected to control the amplification of at least one amplifier stage within the radio object detection receiver, and accordingly to vary the sensitivity of the receiver inversely as the output intensity of the transmitter varied.

In the second version of the present invention, adapted particularly for a pulse transmission system, and shown in Fig. 2 connected to such a radio object detection system employing a common directive antenna for transmission and reception, a similar detector 111 and sensitivity control amplifier 95' are shown applied for varying the amplification of at least one amplifier stage 55' of the object detection receiver. However, in this second version of the present invention, the ultra high frequency transmitter 11', 11" is coupled to a detector 111 through leakage of ultra high frequency energy through T-R box 106 and the radio object detection receiver, and the detector 111 accordingly must be switched from an operative condition during the momentary pulses of ultra high frequency energy transmitted from the transmitter 11', 11" to an inoperative condition during the relatively long intervals between successive pulses. This is accomplished by the use of trigger voltage developed in an auxiliary winding 104 of a coupling transformer 101 between pulse generator 11' and ultra high frequency oscillator 11", applied to a trigger circuit operating on the grid 112 of the detector 111.

In each of these versions, shown respectively in Fig. 1 and Fig. 2, means is provided responsive to the output energy intensity level of the ultra high frequency transmitter, for delivering a signal or voltage varying according to this intensity, and further means is provided for varying the radio object detection receiver sensitivity in response to the signal produced by said first means, so that the receiver sensitivity is varied substantially inversely with variations of the transmitter output intensity. Thus, even though the rotation of a transmitting antenna 13 or 13' produces an appreciable, undesirable reaction on the transmitter 11 or 11', 11", resulting in periodic variations of transmitter output intensity, the receiver sensitivity is varied in such a manner that the signal output intensity of the receiver is made independent of the above variations of transmitter output intensity. The receiver output therefore varies only in dependence on the position of the distant object being detected and tracked by the radio object detection system.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination with a radio object detection and tracking system including an ultra high frequency pulse transmitter, an ultra high frequency pulse receiver, variable directive antenna means adapted to cooperate with said transmitter and said receiver for projection of ultra high frequency energy toward an object and reception of ultra high frequency energy reflected therefrom, said ultra high frequency pulse receiver having an amplifier coupled to said antenna means for amplifying energy received therethrough, and means for periodically varying the direction of said energy projection to produce corresponding periodic variation of intensity of energy received from an object, whereby the phase of said intensity variation relative to the phase of antenna directional variation is indicative of the direction of said object, apparatus for suppressing modulation of said amplified energy due to transmitted energy variations during said periodic directional variation comprising means coupled to said transmitter for detecting variations of output energy therefrom, and means responsive to said detecting means and coupled to said amplifier for varying the amplification of said receiver in accordance with said transmitter energy variations.

2. In a receiver for use with a radio object detection transmitter, automatic volume control apparatus comprising heterodyning means responsive to the intensity of energy produced by the transmitter for producing a signal varying according to said intensity, and means connected to said heterodyning means responsive to said varying signal and independent of signals received by said receiver for varying the amplification of said receiver substantially in inverse proportion to the intensity of said radiated energy.

3. A radio object detection system comprising an ultra high frequency transmitter for sending energy toward a reflective object, an ultra high frequency receiver for receiving and detecting energy reflected from said object, heterodyning means responsive to variations in intensity of the radio frequency signal produced by said transmitter for producing a signal varying in accordance therewith, and means responsive to said varying signal and independent of the intensity of received energy for decreasing the sensitivity of said receiver as said transmitter signal energy intensity increases and increasing the sensitivity of said receiver as said transmitter signal energy intensity decreases.

4. In a receiver for use with a radio object detection transmitter, automatic volume control apparatus comprising a radio frequency detector responsive to the intensity of energy produced by the transmitter for producing a signal varying according to said intensity, and means connected to said detector responsive to said signal and independent of signals received by said receiver for varying the amplification of said receiver substantially in inverse proportion to the intensity of said radiated energy.

5. In a receiver for use with a radio object detection system including an ultra high frequency pulse transmitter, heterodyning means responsive to the intensity of the energy produced by the transmitter and to the intensity of the energy received by reflection from objects for producing signals varying according to said intensities, an intermediate frequency amplifier responsive to the output of said heterodyning means, a rectifier responsive to the output of said intermediate frequency amplifier, means synchronized with said transmitter for de-activating said rectifier during the successive intervals between the pulses produced by said transmitter, and means responsive to the output of said rectifier for varying the gain of said receiver inversely in accordance with the magnitude of the signals produced by said rectifier.

6. A radio object detection system comprising an ultra high frequency transmitter, an ultra high frequency receiver, a pair of variable directive antennas respectively coupled to said transmitter and said receiver, heterodyne means coupled to the coupling means between said transmitter and the antenna coupled thereto, detecting means responsive to the output of said heterodyne means, and means responsive to the output of said detecting means for varying the amplification of said receiver inversely in accordance with the magnitude of the signals produced by said detecting means.

ERNEST FRANK.
MARY P. PENSYL,
*Executrix of the Estate of Daniel S. Pensyl, Deceased.*

(References on following page)

REFERENCES CITED

The following references are of record in the file of this patent:

UNITED STATES PATENTS

| Number | Name | Date |
|---|---|---|
| 1,924,174 | Wolf | Aug. 29, 1933 |
| 2,158,198 | Prescott | May 16, 1939 |
| 2,227,598 | Lyman et al. | Jan. 7, 1941 |
| 2,329,570 | Wellenstein | Sept. 14, 1943 |
| 2,361,648 | Petty | Oct. 31, 1944 |
| 2,400,641 | Hardy | May 21, 1946 |
| 2,411,572 | Hershberger | Nov. 26, 1946 |
| 2,435,960 | Fyler | Feb. 17, 1948 |
| 2,444,721 | Blaisdell | July 6, 1948 |

FOREIGN PATENTS

| Number | Name | Date |
|---|---|---|
| 472,891 | Great Britain | Sept. 29, 1937 |